United States Patent [19]
Lee et al.

[11] Patent Number: 5,598,984
[45] Date of Patent: Feb. 4, 1997

[54] REEL TABLE MOVING DEVICE FOR VIDEO CASSETTE TAPE RECORDER

[75] Inventors: Kyeong-Won Lee, Kyungki-Do; Dong-Kyu Kim, Seoul, both of Rep. of Korea

[73] Assignee: Goldstar Co., Ltd., Seoul, Rep. of Korea

[21] Appl. No.: 369,131

[22] Filed: Jan. 5, 1995

[30] Foreign Application Priority Data

Jan. 7, 1994 [KR] Rep. of Korea ................ 215/1994

[51] Int. Cl.$^6$ .................................................. G11B 15/675
[52] U.S. Cl. ................................ 242/338.4; 242/336
[58] Field of Search ............................. 242/336, 338, 242/338.4; 360/93, 94, 96.5, 96.6

[56] References Cited

U.S. PATENT DOCUMENTS 5,314,141  5/1994  Ishii et al. ........................... 242/336
5,316,236  5/1994  Hasegawa et al. .................. 242/347.1

FOREIGN PATENT DOCUMENTS 60-40546  3/1985  Japan .................................. 242/336

*Primary Examiner*—John P. Darling

[57] ABSTRACT

A reel table moving device for a video cassette tape recorder includes a mechanism for automatically positioning a pair of reel tables in response to insertion of a predetermined size video cassette without the need for an independent drive motor or sensor. The device includes a pair of protrusions mounted to opposite end portions of a moving member which are adapted to engage the tape cassette being inserted into the inlet port. The moving member moves in response to insertion of the tape cassette into the inlet port. In turn, an actuating member is connected to and moves in response to the movement of the moving member for causing the reel tables to move to a desired position for receiving a predetermined size tape cassette.

12 Claims, 5 Drawing Sheets

REEL TABLE MOVING DEVICE FOR VIDEO CASSETTE TAPE RECORDER

BACKGROUND OF THE INVENTION

1. Field of the Invention

The present invention relates to a reel table moving device for a video cassette tape recorder, and more particularly to a reel table moving device capable of moving a reel table without using any drive motor and any sensor.

2. Description of the Prior Art

Conventional reel table moving devices are constructed to use both a large tape cassette and a small tape cassette. These tape cassettes are designated by the reference numerals 1 and 2 in FIGS. 1A and 1B, respectively. The tape cassette shown in FIG. 1A is the standard tape cassette 1 being widely used. On the other hand, the tape cassette shown in FIG. 1B is the small-size tape cassette 2.

Referring to FIG. 2, there is illustrated an example of conventional reel table moving devices. As shown in FIG. 2, the reel table moving device includes a drive motor 3 fixedly mounted to one side portion of the central part of a housing 10 and provided with a shaft 3a. To the shaft 3a, a cylindrical worm 5 is coaxially connected so that it is integral with the shaft 3a. Accordingly, the cylindrical worm 5 is operatively connected to the drive motor 3. In both sides of the cylindrical worm 5, a pair of worm wheels 4 and 4a are engaged with the cylindrical worm 5, respectively. To the worm wheels 4 and 4a, a pair of reel tables 9 are connected by means of arms 8, respectively. The arms 8 are pivotally mounted at their one ends to appropriate portions of the worm wheels 4 and 4a by means of pins 8a, respectively, and at their the other ends to appropriate portions of the reel tables 9 by means of another pins 8a, respectively.

The reel table moving device further includes a pair of guide members 6 for guiding movements of the reel tables 9, respectively. As the worm wheels 4 and 4a rotate, the reel tables 9 move laterally and vertically along the guide members 6, as indicated by arrows in FIG. 2.

Now, operation of the reel table moving device having the above-mentioned construction will be described. As a tape cassette is inserted into an inlet port (not shown) of a video cassette tape recorder, it is sensed by a sensor (not shown). The sensor senses the size of the inserted tape cassette to determine whether the inserted tape cassette corresponds to the standard tape cassette 1 or the small-size tape cassette 2. On the basis of the result of the determination, driving of the drive motor 3 is controlled. Where the inserted tape cassette corresponds to the small-size tape cassette 2, the drive motor 3 is not driven. That is, the reel table moving device operates at the state shown in FIG. 2. In the case of the standard tape cassette 1, however, the drive motor 3 is driven.

As the drive motor 3 is driven in the case of the standard tape cassette 1, the shaft 3a of the drive motor 3 rotates, thereby causing the cylindrical worm 5 to rotate. Since the worm wheels 4 and 4a are engaged with the cylindrical worm 5, they rotate in response to rotation of the cylindrical worm 5. As the worm wheels 4 and 4a rotate, the reel tables 9 connected to the worm wheels 4 and 4a by the arms 8 move downwards and outwardly along the guide members 6, respectively.

Referring to FIG. 3, there is illustrated another conventional reel table moving device. As shown in FIG. 3, the reel table moving device includes a drive motor 21 fixedly mounted to an appropriate portion of a chassis (not shown) and provided with a shaft 21a. To the shaft 21a, a cylindrical worm 22 is connected so that it is integral with the shaft 21a. In both sides of the cylindrical worm 22, a pair of worm gears 23 and a pair of worm gears 23a are engaged with the cylindrical worm 22, respectively. The worm gears 23 are connected to each other by means of a timing belt 24. In similar, the worm gears 23a are connected to each other by means of a timing belt 24a.

A pair of guide members 27 and 27a are connected to the timing belts 24 and 24a. To the guide members 27 and 27a, a pair of reel tables 25 and 25a are mounted such that they move laterally and vertically along guides 26 and 26' as the guide members 27 and 27a move, respectively.

Operation of the reel table moving device having the above-mentioned construction will now be described. As a tape cassette is inserted into an inlet port (not shown) of a video cassette tape recorder, it is sensed by a sensor (not shown). The sensor senses the size of the inserted tape cassette to determine whether the inserted tape cassette corresponds to the standard tape cassette 1 or the small-size tape cassette 2. On the basis of the result of the determination, driving of the drive motor 21 is controlled. Where the inserted tape cassette corresponds to the small-size tape cassette 2, the drive motor 21 is not driven because the reel tables 25 and 25a are positioned at their upper positions (initial positions), respectively. In the case of the standard tape cassette 1, however, the drive motor 21 is driven.

As the drive motor 21 is driven in the case of the standard tape cassette 1, the cylindrical worm 22 connected to the shaft 21a of drive motor 21 rotates. Since the worm gears 23 and 23a are engaged with the cylindrical worm 22, they rotate by the rotation of the cylindrical worm 22. As the worm gears 23 and 23a rotate, the guide members 27 and 27a move, thereby causing the reel tables 25 and 25a to move downwards and outwardly along the guide members 26 and 27a, respectively. The reel tables 25 and 25a are stopped respectively at positions allowing the standard tape cassette 1 inserted into the inlet port to be loaded.

Since the above-mentioned reel table moving devices have the sensor for sensing the size of the inserted tape cassette and drive means adapted to move the reel tables and constituted by the drive motor and worm gears or timing belts, their constructions are complex. Such a complex construction results in a complicated and expensive manufacturing procedure for constructing conventional devices.

SUMMARY OF THE INVENTION

Therefore, an object of the invention is to provide a reel table moving device for a video cassette tape recorder having a simple construction capable of moving a reel table only by use of horizontal moving means and vertical moving means without using any drive motor for moving the reel table.

In accordance with the present invention, this object can be accomplished by providing a reel table moving device for a video cassette tape recorder comprising: horizontal moving means adapted to horizontally move a tape cassette once inserted into an inlet port of the video cassette tape recorder and thereby force the reel tables to move without using any cassette sensing means and any drive means for moving the reel tables; and returning means adapted to return the respective reel tables moved by the horizontal moving means to their original positions.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of preferred embodiments with reference to the accompanying drawings in which.

DETAILED DESCRIPTION OF THE PREFERRED EMBODIMENTS

Figure 4:
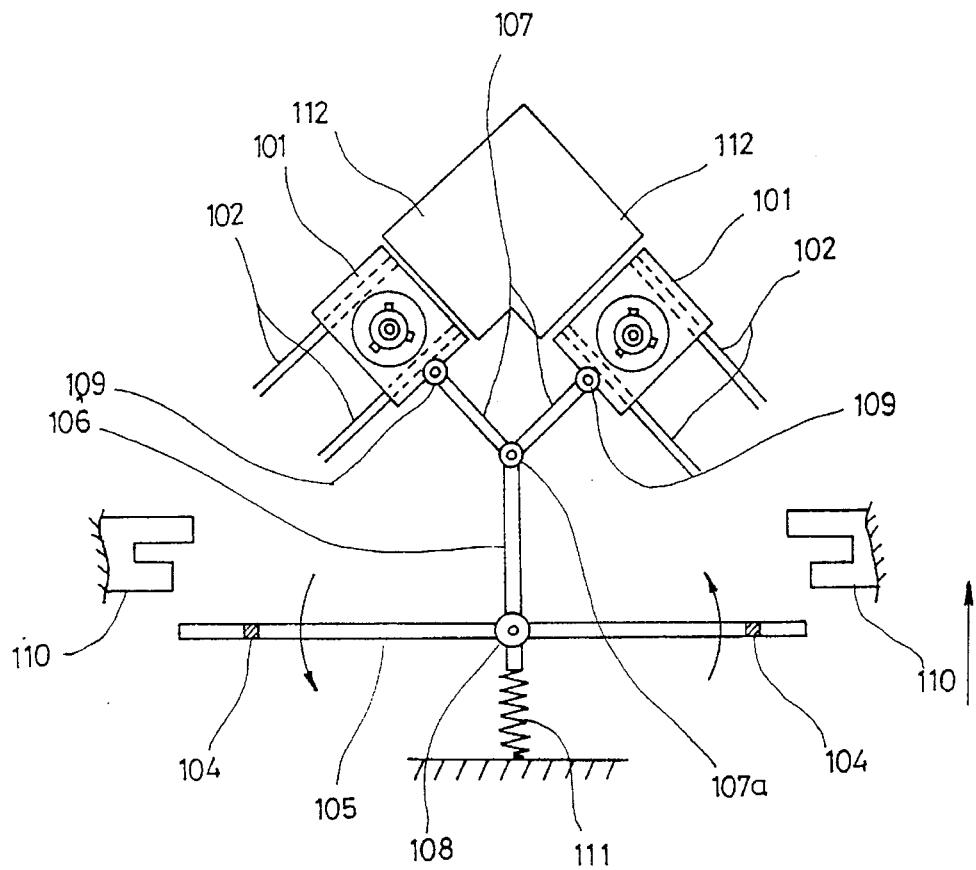
FIG. 4 is a schematic plan view illustrating a reel table moving device for a video cassette tape recorder in accordance with a first embodiment of the present invention.

Referring to FIG. 4, there is illustrated a reel table moving device for a video cassette tape recorder in accordance with a first embodiment of the present invention.

Figure 1A:
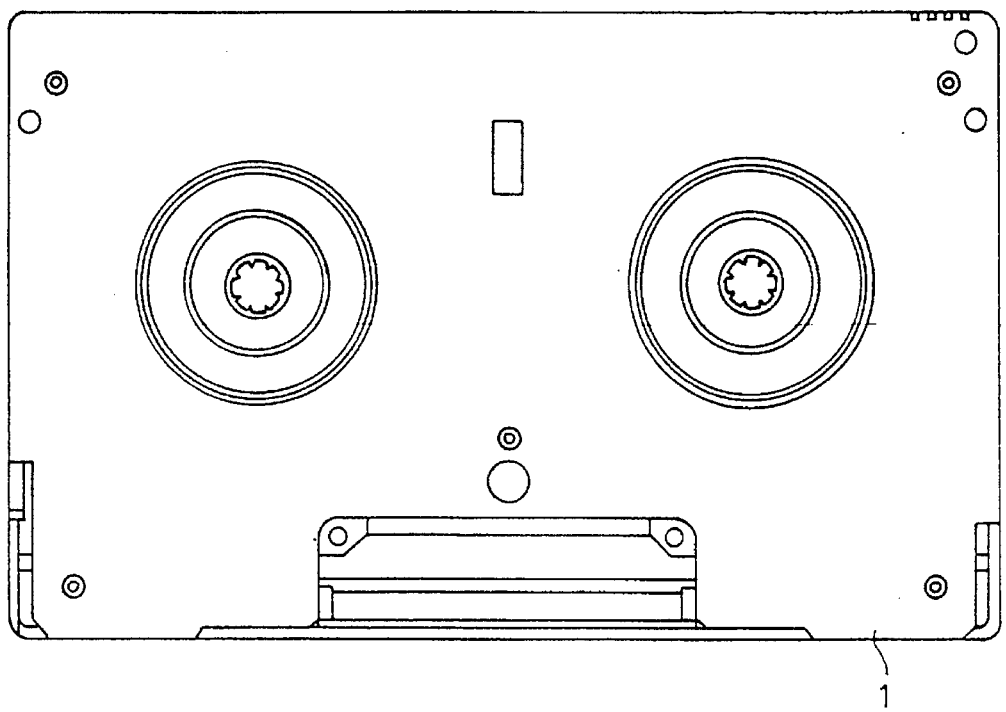
FIGS. 1A and 1B are plan views respectively illustrating general tape cassettes having different sizes.
Figure 1B:
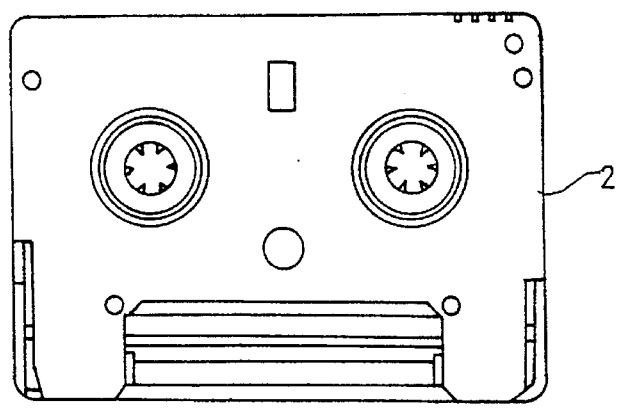
Figure 2:
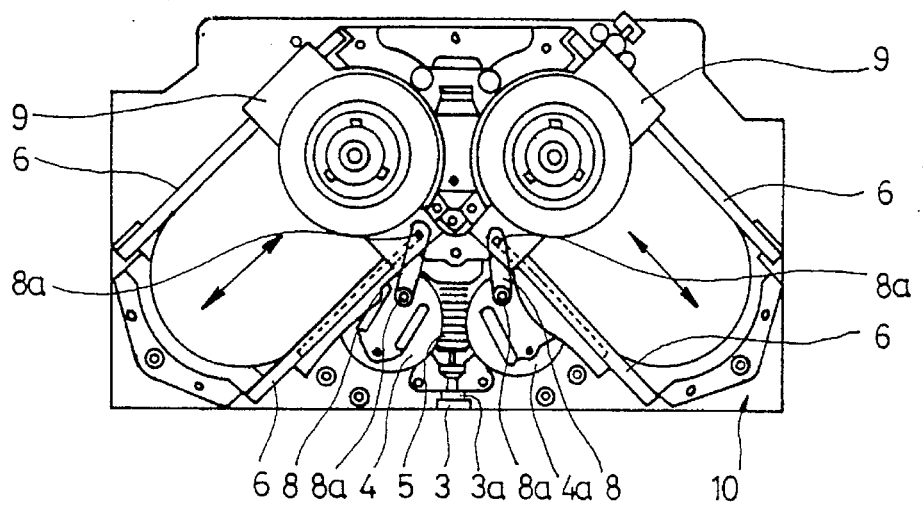
FIG. 2 is a schematic plan view illustrating a conventional reel table moving device for a video cassette tape recorder.
Figure 3:
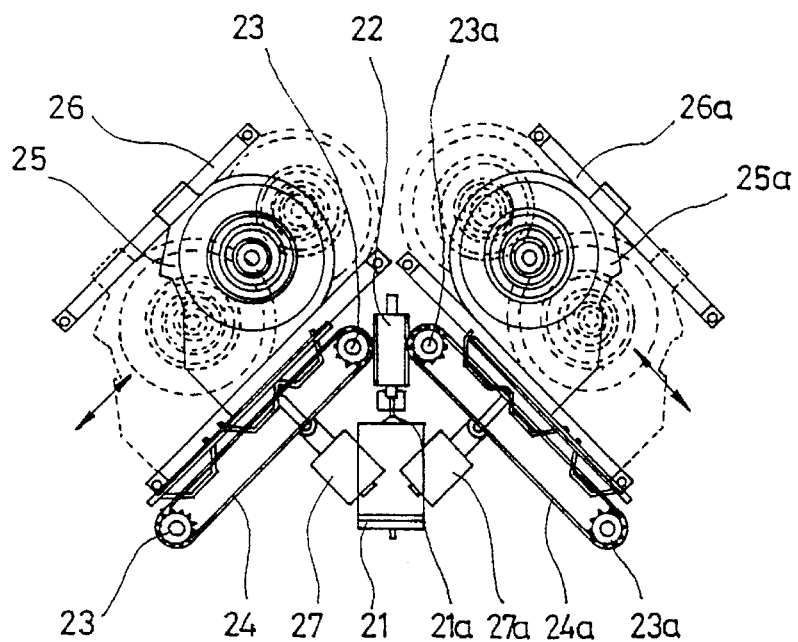
FIG. 3 is a schematic plan view illustrating another reel table moving device.

As shown in FIG. 4, the reel table moving device includes horizontal moving means adapted to move horizontally for accomodating a tape cassette, (which may be one of the tape cassettes respectively having a large-size or a small-size and being similar to those shown in FIG. 1A and 1B, inserted into an inlet port (not shown) of the video cassette tape recorder. By the horizontal movement, the horizontal moving means forces the reel tables 101 to move horizontally. The reel table moving device also includes returning means adapted to return the reel tables 101 moved by the horizontal moving means respectively to their original positions.

As shown in FIG. 4, the horizontal moving means comprises a moving member 105 having a bar shape and moving or pivoting in response to a tape cassette being inserted into the inlet port. A pair of protrusions 104 are mounted to laterally spaced portions of the moving member 105. The protrusions 104 are made of an elastic material and adapted to engage the tape cassette. The horizontal moving means further comprises an actuating member 106 connected to the moving member 105 and adapted to move forwards and rearwards responsive to the movement of the moving member 105, and reel table moving means adapted to move the reel tables 101 responsive to the forward and rearward movement of the actuating member 106.

Each of the reel tables 101 is slidably mounted to a plurality of guide bars 102 horizontally fixed to appropriate portions of a chassis (not shown). To one side portion of each reel table 101, a link 107 is pivotally mounted at its one end by means of a pin 109. The links 107 constitute the reel table moving means. The links 107 are pivotally coupled at the other ends thereof to one end of the actuating member 106 by means of a pin 107a so that they are operatively connected to the actuating member 106.

Forwards of the reel tables 101, a pair of front stoppers 110 are mounted to a housing (not shown). The front stoppers 110 serve to prevent the moving member 105 from moving rearward beyond a predetermined position such as when the tape cassette is of the large-size. The large-size tape cassette is denoted by the reference numeral 103a in FIG. 7. Rearward of the reel tables 101, a rear stopper 112 is disposed for preventing the reel tables 101 from moving rearward beyond predetermined positions. In the illustrated embodiment, the rear stopper 112 is constituted by a plate having a substantially square shape. In place of the rear stopper 112, fixed protrusions (or other suitable devices) may be provided at ends of the guide bars, respectively, to serve as stoppers in some cases.

The moving member 105 is pivotally connected at its middle portion to the other end of the actuating member 106 by means of a pivot 108 so that the moving member 105 pivots about the pivot 108 with respect to the actuating member 106 when one of the protrusions 104 is pushed rearward by the tape cassette where the tape cassette is of the small-size. The small-size tape cassette is denoted by the reference numeral 103 in FIG. 5. The pivotal movement of the moving member 105 is limited to a predetermined range by the front stoppers 110 coming into contact with a corresponding end of the moving member 105. Normally, the moving member 105 is positioned perpendicular to the actuating member 106. As mentioned above, the actuating member 106 is pivotally connected at its one end with the links 107 by means of the pin 107a. To the other end of the actuating member 106, a resilience member 111 is fixedly mounted at its one end. The other end of the resilience member 111 is fixed to an appropriate portion of the chassis. The resilience member 111 serves to pull the elements of the horizontal moving means to their original positions, respectively, upon ejecting the tape cassette.

The resilience member 111 constitutes a part of the returning means. The returning means also comprises the rear stopper 112 adapted to prevent the elements of the horizontal moving means pulled by the resilience member 111 from moving rearwards no longer.

Figure 5:
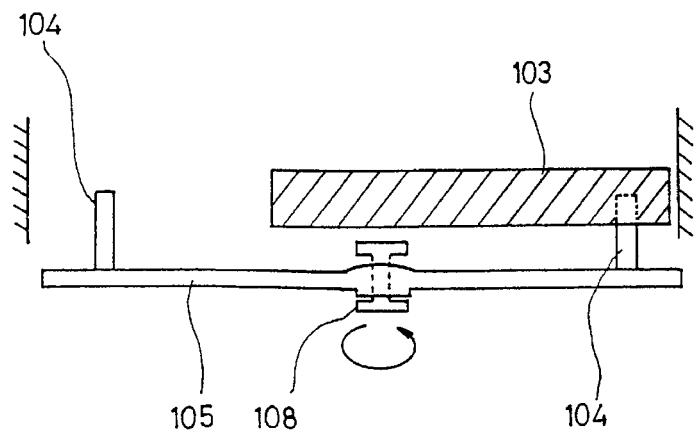
FIG. 5 is a schematic front view showing a condition of the reel table moving device of FIG. 4 when a small-size tape cassette is inserted into an inlet port of the video cassette tape recorder.

Operation of the reel table moving device having the above-mentioned construction in accordance with the first embodiment of the present invention will now be described. As a tape cassette having the small-size, that is, the tape cassette 103 is inserted into the inlet port of the video cassette tape recorder, as shown in FIG. 5, it pushes one of the protrusions 104 provided at the moving member 105, thereby causing the moving member 105 to pivot about the pin 108 as indicated by arrows in FIG. 4. The pivotal movement of the moving member 105 is continued until one end of the moving member 105 comes into contact with a corresponding one of the front stoppers 110. Once the one end of the moving member 105 comes into contact with the corresponding front stopper 110, the small-size tape cassette 103 being inserted bends one of the protrusions 104 against the elastic force thereof and continues its insertion while sliding over the bent protrusion 104.

During insertion of the small-size tape cassette 103, the reel tables 101 do not move and are maintained at their positions allowing the small-size tape cassette 103 to be loaded, as shown in FIG. 4. Accordingly, the small-size tape cassette 103 can be easily inserted and loaded.

Figure 7:
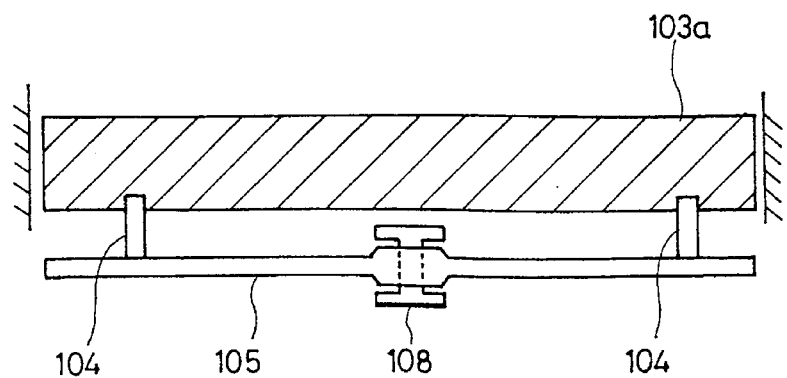
FIG. 7 is a sectional view showing the condition of the reel table moving device of FIG. 4 when the large-size tape cassette is inserted into the inlet port of the video cassette tape recorder.

Meanwhile, FIG. 7 is a sectional view illustrating an operation of the reel table moving device carried out upon inserting a large-size tape cassette 103a, that is, the tape cassette 103a into the inlet port of the video cassette tape recorder. When the large-size tape cassette 103a is inserted into the inlet port, both of the protrusions 104 come into contact with the large-size tape cassette 103a being inserted.

Figure 6:
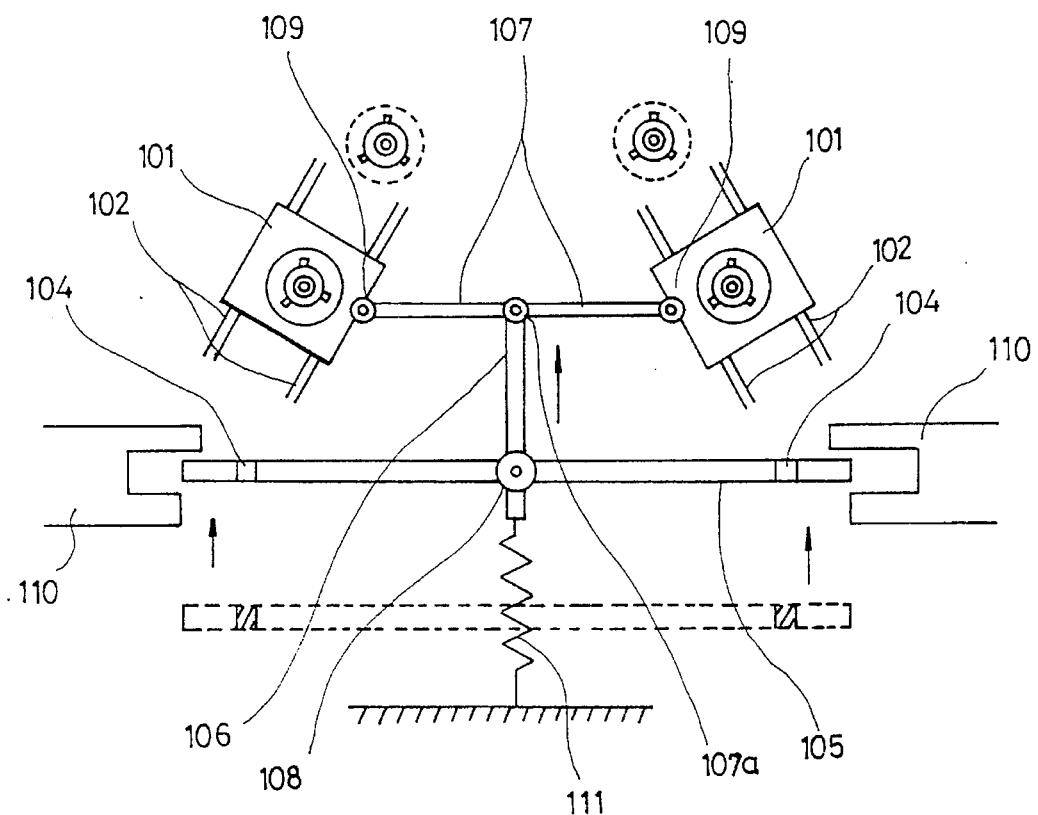
FIG. 6 is a schematic plan view showing a condition of the reel table moving device of FIG. 4 when a large-size tape cassette is inserted into the inlet port of the video cassette tape recorder.

Since the large-size tape cassette 103a pushes both of the protrusions 104, the moving member 105 supporting the protrusions 104 moves rearwards responsive to the inserting movement of the large-size tape cassette 103a, as indicated by arrows in FIG. 6. At this time, the actuating member 106 coupled to the moving member 105 also moves rearwards. As the actuating member 106 moves rearwards, the links 107 pivotally connected to the actuating member 106 pivot outward about the pin 107a. That is, the links 107 pivot from their retracted positions to their developed positions. Upon such movements of the links 107, the reel tables 101 move along the guide bars 102, respectively. During the movement of the reel tables 101, the moving member 105 and the links 107 are maintained in a substantially horizontal state. The rearward movement of the moving member 105 is limited by the front stoppers 110 respectively mounted to opposite ends of the housing (not shown). When the rearward movement of the moving member 105 is stopped by the front stoppers 110, the reel tables 101 are positioned for allowing the large-size tape cassette 103a to be loaded. Once the front stoppers 110 come into contact with opposite ends of the moving member 105, the front stopper 105 respectively move toward each other to trap the opposite ends of the moving member 105. Accordingly, the moving member 105 is maintained at its position for maintaining the reel tables 101 at the large-size tape cassette 103a loading positions. Once the moving member 105 is stopped by the front stoppers 110, the large-size tape cassette 103a being inserted bends the protrusions 104 against the elastic force of the protrusions 104 and continues its insertion while sliding over the bent front stoppers 110. Thus, the large-size tape cassette 103a may be loaded in the video cassette tape recorder.

When the large-size tape cassette 103a is ejected, the stoppers 110 move away from each other, thereby causing the actuating member 106 and the moving member 105 to be pulled forward by the resilient force of the resilience member 111. Accordingly, the moving member 105 is returned to its original position shown in FIG. 4. At the same time, the reel tables 101 move rearwards until they come into contact with the rear stopper 112.

Figure 8:
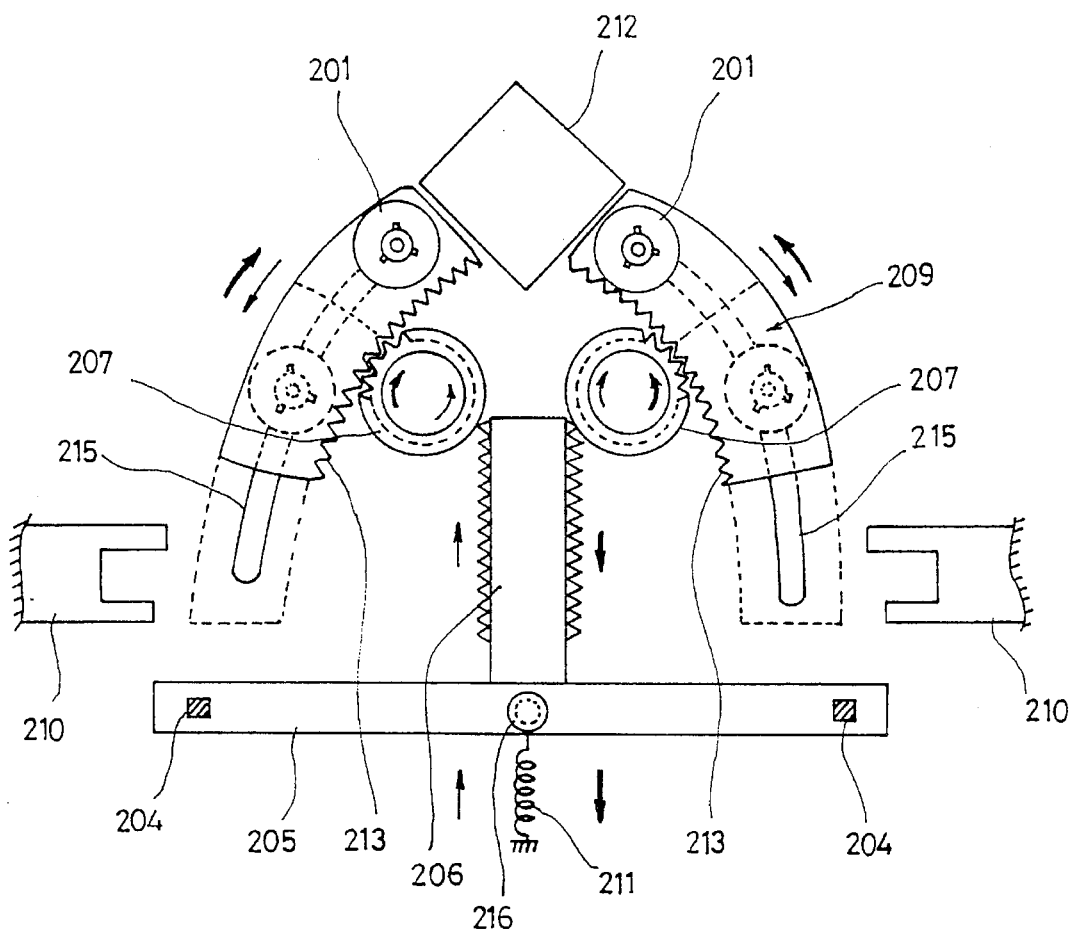
FIG. 8 is a schematic plan view illustrating a reel table moving device in accordance with a second embodiment of the present invention.

Referring to FIG. 8, there is illustrated a reel table moving device in accordance with a second embodiment of the present invention.

Similar to the first embodiment, the reel table moving device shown in FIG. 8 includes horizontal moving means adapted to move horizontally for accommodating a tape cassette, (which may be a large-size or small-size tape cassette,) inserted into the inlet port of the video cassette tape recorder. By the horizontal movement, the horizontal moving means forces reel tables 201 to move horizontally. The reel table moving device also includes returning means adapted to return the reel tables 201 moved by the horizontal moving means respectively to their original positions.

As shown in FIG. 8, the horizontal moving means comprises a moving member 205 adapted to move in response to a large-size tape cassette 203a being inserted into the inlet port. At least one of protrusion 204 (in the illustrated case, two protrusions) is provided on the moving member 205. The protrusions 204 are adapted to come into contact with the large-size tape cassette 203a being inserted. The horizontal moving means further comprises a rack member 206 mounted to the middle portion of the moving member 205 and adapted to move in response to the forward and rearward movement of the moving member 205; and reel table moving means adapted to move the reel tables 201 in response to the forward and rearward movement of the actuating member 206. The rack member 206 is provided at each of its opposite side portions with racks.

The reel table moving means comprises a pair of pinions 207 respectively engaged with the racks of the rack member 206 and adapted to rotate upon movement of the rack member 206, and a pair of reel plates 209 respectively provided with reel plate racks 213 engaged with the pinions 207. To respective upper portions of the reel plates 209, reel tables 201 are mounted. The reel tables 201 are guided to move laterally and vertically by reel table guide bars 215 fixedly mounted to a chassis (not shown) disposed beneath the reel plates 209.

Figure 9:
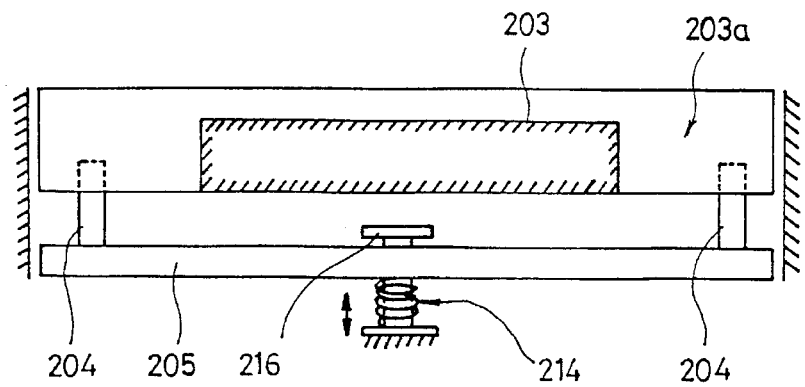
FIG. 9 is a schematic front view showing conditions of the reel table moving device of FIG. 8 respectively when the large-size tape cassette and the small-size tape cassette are inserted into the inlet port of the video cassette tape recorder.

The protrusions 204 are fixedly mounted to opposite end portions of the moving member 205 and made of a rigid material. Each of the protrusions 204 has an upper end inclined rearwards. At the middle portion of the moving member 205, mounting means 216 such as small bolt and nut or a pin is mounted. By the mounting means 216, the moving member 205 and the rack member 206 are coupled to each other. A resilience member 211 is coupled at one end by the mounting means 216 to the moving member 205. The other end of the resilience member 211 is fixedly mounted to a chassis (not shown). Although only one resilience member 211 is shown in FIG. 8, a plurality of resilience members may be mounted to appropriate portions of the moving member 205, respectively, in some cases. As shown in FIG. 9, a resilience member 214 is fitted around a protruded lower portion of the mounting means 216 inserted into a through hole of the moving member 205. The resilience member 214 serves to urge the moving member 205 upwards.

Rearwards of the moving member 205, a pair of front stoppers 210 are mounted to a housing (not shown) such that they move laterally. The front stoppers 210 serves to prevent the moving member 205 from moving rearwards beyond a predetermined position upon insertion of the large-size tape cassette 203a.

The resilience member 211 constitutes a part of the returning means. The resilience member 211 serves to pull the elements of the horizontal moving means back to their initial position upon ejecting a tape cassette loaded. The returning means also comprises a rear stopper 212 adapted to prevent the elements of the horizontal moving means pulled by the resilience member 211 from moving rearwards beyond their respective predetermined positions.

The reel table moving device of the second embodiment operates in a manner similar to that of the first embodiment except that the operation is carried out using the rack-and-pinion mechanism in place of the link mechanism. Now, the operation of the reel table moving device of the second embodiment will be described.

When a small-size tape cassette 203 is inserted into the video cassette tape recorder, the insertion of the small-size tape cassette 203 is carried out through a middle portion of the inlet port so that the small-size tape cassette 203 does not engage the protrusions 204 respectively mounted to the opposite end portions of the moving member 205, as shown in FIG. 9. At this time, the reel tables 201 are maintained at their initial positions adjacent to the rear stopper 212, respectively, as shown in FIG. 8. Accordingly, the small-size tape cassette 203 can be easily loaded on the reel tables 201.

Meanwhile, when a large-size tape cassette 203a is inserted into the inlet port, the inclined upper ends of the protrusion 204 contact with the large-size tape cassette 203a being inserted, as shown in FIG. 9. As the large-size tape cassette 203a pushes both protrusions 104, the moving member 205 supporting the protrusions 204 moves rearwards responsive to the inserting movement of the large-size tape cassette 203a, as indicated by arrows 220 and 221 in FIG. 8. At the same time, the rack member 206 coupled to the moving member 205 also moves rearwards. As the rack member 206 moves rearwards, the pinions 207 engaged with the racks of the rack member 206 rotate, so that the reel plates 209 respectively engaged at their reel plate racks 213 with the pinions 207 move downwards. As the reel plates 209 move downwards, the reel tables 201 move downwards along the reel table guide bars 215 to positions allowing the large-size tape cassette 203a to be loaded. The rearward movement of the moving member 205 is limited by the front stoppers 210. When the moving member 205 is stopped by the front stoppers 210, the reel tables 201 are positioned at positions allowing the large-size tape cassette 203a to be loaded. Once the front stoppers 210 come into contact with opposite ends of the moving member 205, they move toward each other to trap the opposite ends of the moving member 205, respectively. Accordingly, the moving member 205 is maintained at its position where the reel tables 201 are positioned at the cassette loading positions. Once the moving member 205 is stopped by the front stoppers 210, the large-size tape cassette 203a being inserted slides along the inclined upper ends of the protrusions 204 while pressing down the protrusions 204 (and the moving member 205 against the resilient force of the resilience member 214. Accordingly, the tape cassette 203a can be inserted without interfering with the protrusions 204 and the moving member 205 allowing the large-size tape to be cassette 203a loaded in the video cassette tape recorder.

As apparent from the above description, the present invention provides a reel table moving device for a video cassette tape recorder having a simple construction including a moving member adapted to pivot or move by a movement force of a tape cassette being inserted, thereby capable of moving reel tables without using any drive motor for moving the reel table. By the simple construction, the reel table moving device achieves a reduction in manufacture cost.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A reel table moving device for a video cassette tape recorder, comprising:

moving means for moving a pair of reel tables from a first position accommodating a small sized tape cassette to a second position accommodating a large sized tape cassette upon insertion of the large sized tape cassette into an inlet port of the video cassette tape recorder to move the moving means in a rearward direction with respect to the inlet to thereby force the reel tables to automatically move for accommodating different size tape cassettes; and means for automatically returning the pair of reel tables moved by the moving means to the first position upon ejection of the tape cassette and disengagement of the tape cassette from the moving means.

2. A reel table moving device in accordance with claim 1, wherein the moving means comprises:

a pair of protrusions mounted in a spaced relationship on opposite end portions of a moving member and adapted to engage the tape cassette being inserted into the inlet port;

wherein the moving member moves in response to and upon engagement of the protrusions with the tape cassette being inserted into the inlet port;

an actuating member connected to the moving member and adapted to move in response to the movement of the moving member; and reel table support means for moving each of the pair of reel tables in response to movement of the actuating member.

3. A reel table moving device in accordance with claim 2, wherein the reel table support means comprises a pair of links each pivotally mounted at one end thereof to one end of the actuating member and pivotally mounted at the other end thereof to a corresponding one of the pair of reel tables.

4. A reel table moving device in accordance with claim 2, wherein the moving member is pivotally connected to an end of the actuating member opposite the end connected to a pair of links, wherein said moving member pivots upon engagement of an inserted cassette having a size less than said predetermined size with only one of the pair of protrusions thus maintaining the reel tables in the first position.

5. A reel table moving device in accordance with claim 2, wherein the moving means further comprises means for restricting movement of the moving member from beyond a predetermined range.

6. A reel table moving device in accordance with claim 2, wherein the pair of protrusions are made of an elastic material for enabling each protrusion to bend out of the path of an inserted tape cassette.

7. A reel table moving device in accordance with claim 1, wherein the moving means comprises:

protrusions adapted to engage the tape cassette being inserted into the inlet port when the tape cassette has a predetermined large-size;

a moving member, supporting the protrusions with one of the protrusions being respectively provided at opposite ends thereof and adapted to move in response to engagement of the large-size tape cassette by at least one of the protrusions upon insertion of the large-size cassette into the inlet port and to remain in the first position upon insertion of a tape cassette having a size less than the large-size;

a rack member connected to a middle portion of the moving member and adapted to move in response to movement of the moving member, the rack member having racks respectively at opposite side portions thereof; and reel table support means for moving each of the reel tables in response to the movement of the rack member.

8. A reel table moving device in accordance with claim 7, wherein the reel table support means comprises:

pinions respectively engaged with the racks of the rack member and adapted to rotate in response to movement of the rack member; and reel plates respectively provided with reel plate racks engaged with and operatively connected to the pinions, the reel tables being mounted to respective upper portions of the reel plates, such that upon rotation of the pinions each of the reel plates causes a corresponding one of the reel tables to move between the first and second positions.

9. A reel table moving device in accordance with claim 7, wherein each of the protrusions has a slightly inclined upper end and is made of a rigid material.

10. A reel table moving device in accordance with claim 7, wherein the moving means further comprises mounting means for coupling the moving member and the rack member to each other and for allowing the moving member to move out of the path of the tape cassette as it is inserted into the inlet portion when the protrusions engage the tape cassette being inserted so that the moving member does not interfere with the tape cassette.

11. A reel table moving device in accordance with claim 10, wherein the mounting means is adapted to mount a pair of resilient members, one serving to urge the moving member upwards and the other serving to return the moving member to an original position thereof after completion of the insertion of the tape cassette.

12. A reel table moving device in accordance with claim 1, wherein the returning means comprises:

a resilient member for continuously urging the moving means to the first position such that the pair of reel tables automatically return to the first position upon ejecting the tape cassette; and means for selectively maintaining the moving member in the second position against the urging of the resilient member.

* * * * *